United States Patent [19]

Klank et al.

[11] Patent Number: 4,821,260
[45] Date of Patent: Apr. 11, 1989

[54] TRANSMISSION SYSTEM

[75] Inventors: Otto Klank, Lehrte; Ernst Schröder, Hanover; Walter Voessing, Wennigsen, all of Fed. Rep. of Germany

[73] Assignee: Deutsche Thomson-Brandt GmbH, Villingen-Schwenningen, Fed. Rep. of Germany

[21] Appl. No.: 135,511

[22] Filed: Dec. 16, 1987

[30] Foreign Application Priority Data

Dec. 17, 1986 [DE] Fed. Rep. of Germany ....... 3642982

[51] Int. Cl.$^4$ .......................... H04J 3/00; H04L 27/20
[52] U.S. Cl. ................................... 370/77; 370/110.4; 375/67; 381/2
[58] Field of Search .................... 370/77, 110.1, 110.2, 370/110.3, 118, 110.4; 375/67; 381/2

[56] References Cited

U.S. PATENT DOCUMENTS 4,554,658  11/1985  Marte et al. ...................... 370/110.2
4,750,167   6/1988  Meyer ................................... 370/77

FOREIGN PATENT DOCUMENTS 0073979  8/1982  European Pat. Off. .
0167849  6/1985  European Pat. Off. .
0193143  2/1986  European Pat. Off. .
3506912  8/1986  Fed. Rep. of Germany .
3610398 10/1987  Fed. Rep. of Germany .

OTHER PUBLICATIONS

"An Introduction to Error-Correcting Codes", Shu Lin, Prentice-Hall, Inc., Englewood Cliffs, N.J., pp. 130–135.
"Digital Sound Service for Direct Broadcasting Satellites", The Federal Minister of Research and Technology, pp. 76–79 and 106–108.

Primary Examiner—Robert L. Griffin
Assistant Examiner—Frank M. Scutch, III
Attorney, Agent, or Firm—Spencer & Frank

[57] ABSTRACT

A system for transmitting and receiving digitalized audio signals, particularly via satellites, wherein data sequences are arranged in timely succession within frames, wherein before transmission, the digitalized audio signal is converted to a digital signal representing the momentary frequency spectrum and, during subsequent coding of the digital audio signal to be transmitted, portions of this transformed signal are given different weights on the basis of psychoacoustic laws with respect to the accuracy of their representation.

12 Claims, 4 Drawing Sheets

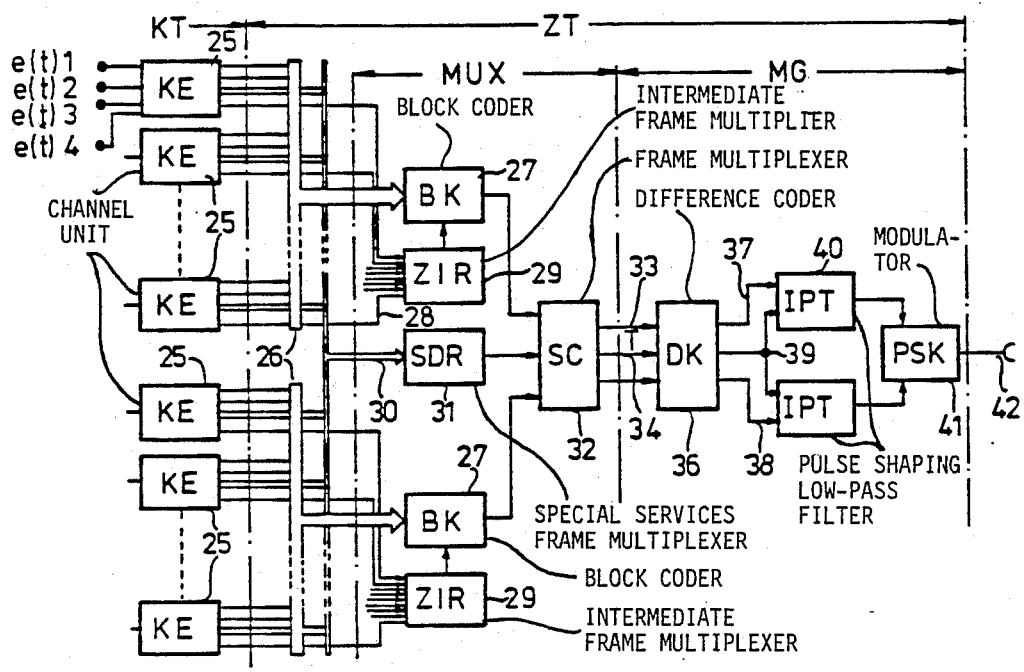
Fig. 2
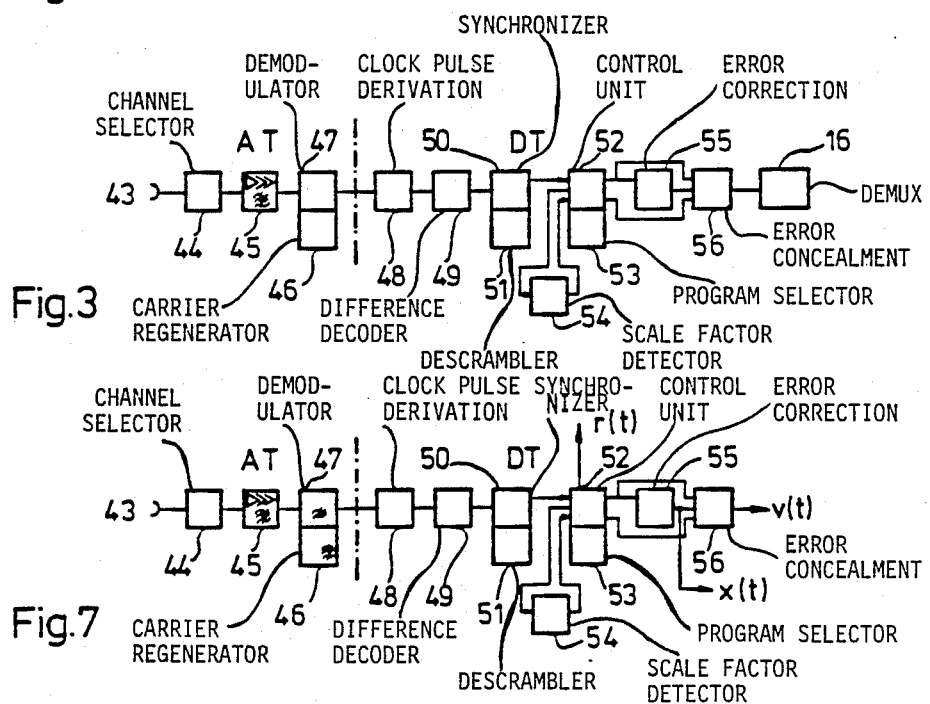
Fig. 3
Fig. 7

TRANSMISSION SYSTEM

BACKGROUND OF THE INVENTION

The present invention relates to a system for transmitting and receiving digitalized audio signals, particularly via satellites, in which data sequences are arranged in time succession within frames.

The informational brochure, entitled "Digitaler Hörfunk über Rundfunksatelliten" [Digital Audio Transmissions By Way Of Radio Satellites], 2nd revised edition, published by the German Federal Ministry of Research and Technology (BMFT), Heinemannstrasse 2, D-5300 Bonn 2, Editor-Grad. Eng. P. Treytel, discloses a frame format in which 16 stereo programs available in parallel form are brought into a suitable serial frame format (page 106, paragraph 3.4, Frame Format). FIG. 47 at page 77 of that brochure shows the block circuit diagram for the entire multiplex and modulation device for the Usingen radio transmission station. At page 78, under Point 1.3, technical data are provided in which the number of audio channels is given as 16 stereo channels or 32 monaural channels, respectively.

SUMMARY OF THE INVENTION

It is an object of the present invention to improve the transmission and reception of digital audio signal data in a system in which transmitted data sequences are arranged in timely succession within frames. In particular, the digitalized data transmitted is to be reduced, preferably on a selective basis within a channel or channels of the system.

The above object is generally achieved according to the present invention in that in a system for transmitting and receiving digitalized audio signals, particularly for satellites, of the type discussed above wherein data sequences are arranged in timely succession within frames for transmission, the digitalized audio signal is transformed or converted before transmission to a digital signal which represents the momentary frequency spectrum of the audio signal and, during subsequent coding of this transformed digital audio signal to be transmitted, parts of this transferred signal are given different weightings on the basis of psychoacoustic laws with respect to the accuracy with which they are ultimately reproduced at the output of a receiver.

Various embodiments and features of the transmitting and receiving system according to the invention, whereby transformed and/or non-transformed digital audio signals are selectively transmitted in a communications channel and wherein error correction codes, internal and/or external to the coded transformed signals, are disclosed.

BRIEF DESCRIPTION OF THE DRAWINGS

FIG. 2 is the block circuit diagram of a multi-channel transmitting station for a system according to the invention.

FIG. 3 is the block circuit diagram of a receiving station for use with the transmitting station of FIG. 2.

FIG. 7 is a further block circuit diagram showing a receiver for the station of FIG. 6.

DETAILED DESCRIPTION OF THE PREFERRED EMBODIMENTS

Figure 1:
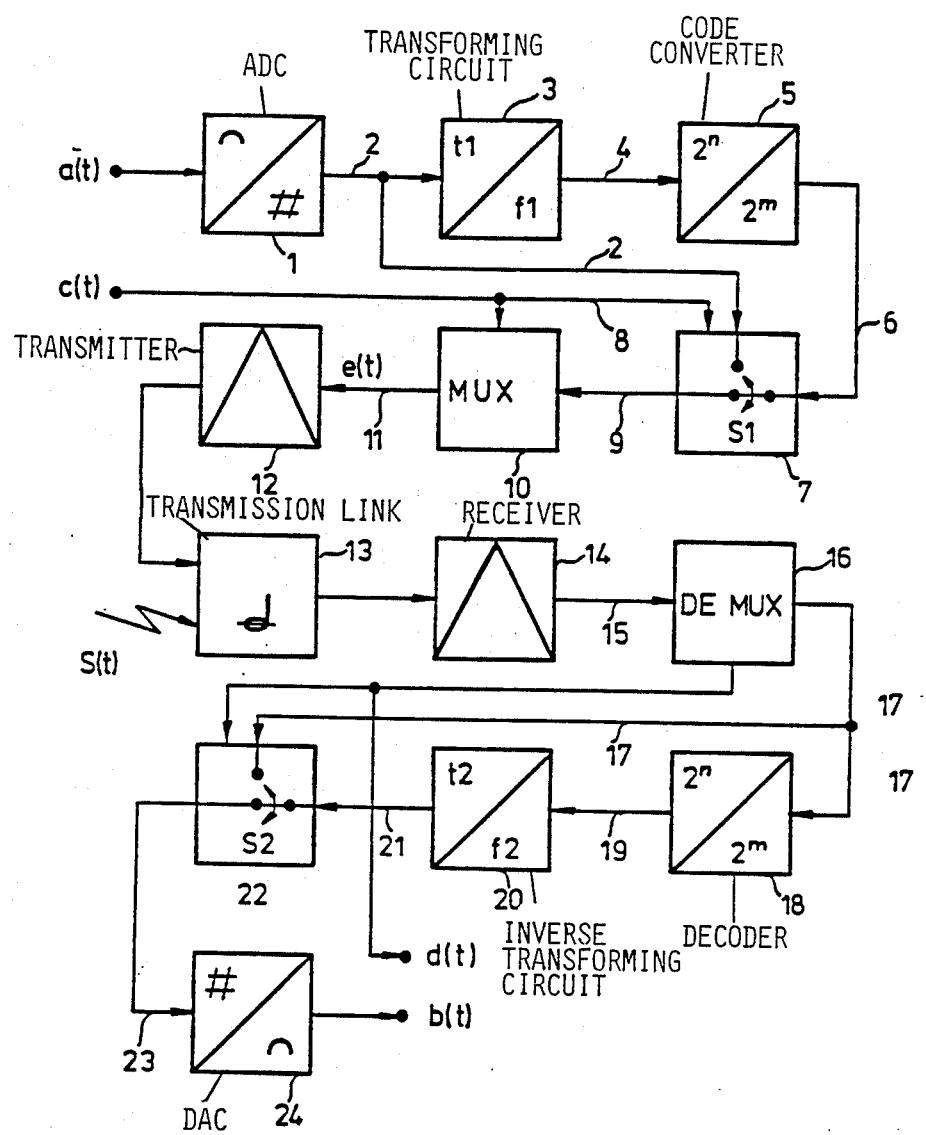
FIG. 1 is, a general block circuit diagram of a communications channel for a system according to the invention.

FIG. 1 is a general block circuit diagram of a communications channel for an audio signal $a(t)$. The analog audio signal $a(t)$ is converted into a digital signal in an analog/digital converter 1, hereinafter called an ADC (analog/digital converter). The digital signal travels through multi-conductor lines 2 to a code transformation circuit or device 3, hereinafter called a transforming member. Transforming member 3 transforms the digital audio signal from the time domain to a frequency domain, i.e., transforming member 3 converts the digitalized audio signal to a signal representing the momentary frequency spectrum of the audio signal. Additionally, in the transforming member 3, portions of the signal representing the momentary spectrum are weighted with respect to the accuracy of their representation on the basis of known psychoacoustic laws. Digital audio signals in the frequency domain are called spectral values. These spectral values are forwarded via a line 4 to a code converter 5. Code converter 5 provides the digital spectral values with additional bits, i.e., parity bits. This is called later the external error code. Encoding as well as decoding proposals are disclosed in SHU LIN, "An Introduction to Error-Correcting Codes", Prentice Hall, Inc. (Englewood Cliffs, N.J.) page 131 to 135. This advance coding permits error correction in the receiving station.

From code converter 5, the spectral values, which have been provided with redundance, are sent through a line 6 to one input of a switch 7, which can selectively switch its output between two input signal paths. In particular, either the digital audio signal directly provided at the output of the digital/analog converter 1 on line 2, or the transformed digital audio signal from code converter 5 on line 7 is selectively provided at the output of switch 7. The position of switch 7 is controlled via a control line 8 by means of a control signal $c(t)$. Switch 7, depending on its position, forwards either the digitalized audio signals or the digitalized transformed audio signals via a line 9 to a multiplexer 10. In multiplexer 10, the signal $c(t)$ and possibly further audio signals are added to the audio signal at the output on line 9 to form a multiplex signal $e(t)$. Signal $c(t)$ informs a receiving station whether the digitalized audio signal or the digitalized transformed audio signal is being transmitted. The multiplex signal $e(t)$ at the output of multiplexer 10 is fed via a line 11 to a transmitter 12.

In transmitter 12, the multiplex signal $e(t)$ is modulated to provide a radio signal. Transmitter 12 sends the radio signal, hereinafter called the RF signal, over a communications transmission channel or link 13. Transmission channel 13 may be an HF radio link, a magnetic tape, a memory or the like. During transmission, the RF signal may be influenced by an interference signal $S(t)$. From transmission channel 13, the RF signal travels to a receiver 14. Receiver 14 demodulates the RF signal and feeds a thus received modulation signal via a line 15 to a demultiplexer 16. Demultiplexer 16 separates the modulation signal into a base band and a control signal d(t). If the signal in transmission channel 13 contains no interference, c(t) and d(t) are identical.

From demultiplexer 16, the base band travels via a line 17 both to a second code converter 18 and to one input of a switch 22. Code converter 18 checks the incoming data and separates the additional bits provided by the code converter 5 from the information signal. If the transmitted audio signal contains interference S(t), code converter 18 attempts to reconstruct the audio signal which contains the interference S(t). Simple interference errors are detected in this code converter 18 and the transformed digital audio signal is reconstructed. Difficult interference errors cannot be reconstructed and are covered up by a concealment circuit. Code converter 18 corrects errors up to a certain number per block, e.g. up to two; beyond this and reliably up to a limit of five errors, error detection with subsequent concealment (averaging over several sampling values) performed. A code converter which can be advantageously used for code converters of blocks 5 and 18 is disclosed in European Pat. No. 73 979 B1 of Dec. 12th, 1985.

The spectral values of the digital audio signal present at the output of code converter 18 are transferred via a line 19 to an inverse transforming member 20. Inverse transforming member 20 transforms the weighted spectral values from the frequency domain back to the time domain. Inverse transforming member 20 feeds the inversely transformed digital audio signals via a line 21 to a second input of switch 22. The control signal d(t) from demultiplexer 16 is fed to the switch 22 to control whether a transmitted and received audio signal is to be picked up directly from the multiplexer 16 or whether the transmitted and received audio signal is to be picked up after having been sent through transforming member 20. At the output of switch 22, the audio signal is present in its basic digital form. From the output of switch 22, the audio signal travels via a line 23 to a digital/analog converter 24, hereinafter called DAC (digital/analog converter). The analog audio signal b(t) is available at the output of DAC 24.

The analog audio signal b(t) at the output of DAC 24 is identical with the original analog audio signal a(t) if the transformation in transforming member 3 and the inverse transformation in inverse transforming member 20 have been omitted from the transmission path and if the signal in transmission channel 13 contains no interference S(t). If, however, the audio signal a(t) does pass through the transformation and inverse transformation circuits 3 and 20, respectively, along its transmission path, then transformation circuit 3 suppresses portions of the digital audio signal which are irrelevant and redundant for the listener, and thus a(t) and b(t) are different.

FIG. 2 is a block circuit diagram of a complete multiplex and modulation device (ZT) for a radio station, i.e., corresponding to a transmitter 12. One channel unit 25 is available for four monaural signals e(t) (see FIG. 1). Monaural signals e(t) are digitalized audio signals or transformed digitalized audio signals. A channel unit 25 processes either two digitalized audio signals e(t), one digital audio signal and two transformed digital audio signals e(t), or four transformed digitalized audio signals e(t). After processing of signals e(t), two 14-bit code words for four monaural channels or two stereo channels are available at the outputs of each channel unit 25.

In the illustrated embodiment, the channel portion (KT) of the system includes sixteen channel units 25, with each group of eight channel units 25 forming one channel portion. The data from each group of eight channel units 25 are transferred via a respective data bus 26 to a respective block coder 27. In each of the block coders 27, the audio signals are coded in BCH (binary coded hexadecimal), and the audio signals coming from the respective group of eight channel units 25 are multiplexed. Via respective lines 28, a scale factor is transmitted to respective ZI (intermediate) frame multiplexers 29 for the respective block coders 27. The scale factor has a function similar to that for commanding and assigns sample data words to certain level regions. (See in this connection page 19 of the above-cited informational brochure.) Via a bus 30, V (verification) bits are passed from channel units 25 to an SD frame multiplexer 31 which processes special services (SD). These special services indicate whether the signal e(t) is part of an opera broadcast, sports news, general news, etc. Additionally, in the system according to the invention, the control signal c(t) is handled as a special service bit. In a scrambler/main frame multiplexer 32, to which the output signals of the block coders 27 and the SD frame multiplexer 31 are fed, successive double blocks are scrambled, provided with a sync word, and combined to form a main frame A' or B', respectively. Block coders 27, ZI frame multiplexers 29, SD frame multiplexer 31 and main frame multiplexer 32 form a multiplexing device (MUX).

The three output lines 33 to 35 emanating from main frame multiplexer 32 for a frame A', a frame B' and a clock pulse signal T are fed to a difference coder 36. Via lines 37 to 39, signals for frames A", B" and clock pulse signal T' are fed to two pulse shaping lowpass filter units 40. In the pulse shaping portions of units 40, unipolar NRZ signals are converted into bipolar signals and the lowpass filter portions of units 40 serve to limit these signals in bandwidth. These bandwidth limited band signals serve as modulation signals for a 4-PSK modulator 41. PSK stands for phase shift keying (English) or "Phasenumtastung" (German). A quartz oscillator (not shown) produces the required 70 MHz carrier for the modulator 41. An IF output filter (not shown) of the 4-PSK modulator 41 suppresses the mixed products generated during modulation. Thus, a PSK signal modulated with 70 MHz is present at output 42 of the PSK modulator. The modulation device (MG) thus includes the difference coder 36, the pulse shaping lowpass filter units 40 and the PSK modulator 41.

FIG. 3 shows a receiver 14 for 4-PSK modulated signals. Such 4-PSK modulated signals are present at input 43. A channel selector 44 selects a receiving frequency band, for example the band with the 70 MHz carrier frequency, and forwards the signal to an amplifier and bandwidth limiter 45. In a demodulator 47, the carrier signal and the useful signal are separated from one another. For coherent demodulation, a carrier regenerator 46 furnishes a carrier signal which has been regenerated from the RF signal. The channel selector 44, the amplifier and bandwidth limiter 45, the carrier regenerator 46 and the demodulator 47 make up the analog portion (AT) of the receiver 14.

Two bit streams corresponding to the two bit streams that were combined in the PSK modulator are again available at the output of the analog portion AT, i.e., at the output of the demodulator 47. In a clock pulse derivation circuit 48, a clock pulse is generated which is synchronous with the given bit sequence in the bit streams. After the clock pulse derivation, the bit streams, which now also contain a difference code, are present at the output but, depending on the latching state of the carrier oscillator, they may be inverted or exchanged or appear inverted at an output. These faulty positions as well as differential coding are removed in the subsequent difference decoder 49 so that the original bit streams are available at its output. To demultiplex the original bit streams, synchronization must be performed accurately in a synchronizer 50, the bit streams must be descrambled in a descrambler 51 and it must be possible to detect the beginning of a frame in the endless data streams. Then, with the aid of counter circuits, a demultiplexer equipped with a control unit 52 can be used to couple out groups of bits belonging to a signal e(t), they can be selected by a program selector 53 and can be processed further. At the same time, the scale factor is considered by a scale factor detection circuit 54. In an error correction circuit 55, the additional bits, hereinafter called parity bits, of the external error code are evaluated and the signals are corrected as much as possible. If errors occur which can no longer be corrected, these errors are covered up in a concealment circuit 56. With the aid of the output signal of scale factor evaluation unit 54, the signal representing the sample values is shifted back into the original value domain according to the transmitted scale factor. From concealment circuit 56 the signals are fed to a demultiplexer 16 (See FIG. 1).

Figure 4:
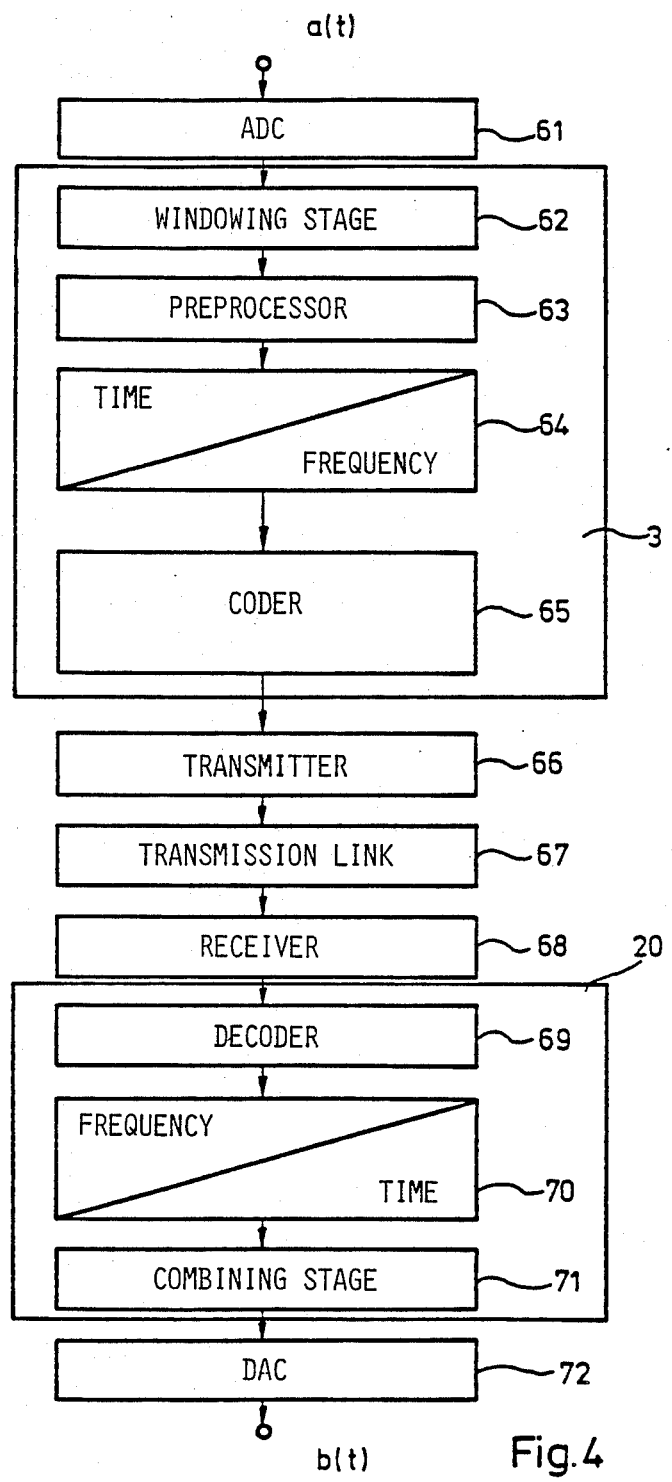
FIG. 4 is a block diagram illustrating the basic method for reducing data in digitalized audio signals in a communication according to the invention.

FIG. 4 shows the process sequence of the procedure employed for data reduction in the audio signals according to the invention generally shown in FIG. 1. The analog signal a(t) which represents an audio signal, such as, for example, voice or music, is converted in ADC stage 61, i.e. corresponding to ADC 1 of FIG. 1, into a corresponding digital audio signal. In stage 62, so-called windowing of the signal occurs by means of timely successive and overlapping time windows. The signal is thus subdivided into time sequential blocks containing 1024 sample values per block, each having a duration of 20 ms per block in such a manner that the signal of each block can be processed further separately. In stage 63 the signal is preprocessed under consideration of suddenly occurring sound events. (See in this connection DE-OS No. 3,506,912 published Aug. 28th, 1986.) In stage 64, the digital signal of a time window or of a block is transformed into a frequency spectrum. Thus, during the timely successive blocks a signal appears at the output of stage 64 which, for th duration of a time window or block, represents the spectral components of the signal over the entire frequency spectrum. Stage 64 thus converts the signal in the time domain to the signal representing the spectrum in the frequency domain.

The signal from stage 64 is fed to a coder 65, wherein it is coded according to psychoacoustic aspects. That means that spectral components which are not discerned in any case during playback, particularly because of masking effects, are given lower weights or are omitted during coding. Such processing of the momentary spectrum is possible, for example, with the aid of a computer. Stages 62 to 65 correspond to transforming member 3 of FIG. 1. A transforming member which can be advantageously used is disclosed in European patent application No. EP 193 143 A2, published Sept. 3rd, 1986.

The thus coded signal travels via a transmitter 66 which corresponds to the transmitter 12 of FIG. 1 to a communication transmission channel or link 67. The resulting reduction in the average bit rate permits this communication channel to be dimensioned with a correspondingly narrow band. Communication transmission channel 67 is followed by receiver 68 which essentially performs functions inverse to those performed by the transmitter 66.

The output signal of the receiver 68 initially reaches a decoder 69 which, corresponding to coder 65, performs decoding. In stage 70, the thus obtained signal representing the spectrum in the frequency domain is reconverted to a digital signal in the time domain. In stage 71 the signal is combined again into a uniform, continuous digital signal and the preprocessing performed in stage 63 is considered. Then the signal is fed to digital/analog converter 72. Converter 72 again furnishes analog signal b(t). This signal b(t) is not identical to signal a(t) because during coding in coder 65 spectral components were given different weights or were suppressed. However, the difference between analog signals b(t) and a(t) is such that it will not be noted by the listener during playback. Thus, only irrelevant information, inaudible for the listener, is removed from the signal to reduce the required bit rate during transmission over communications channel 67. In FIG. 4, the stages 62 to 65 correspond to the transforming member 3 of Fig. 1, stage 66 corresponds to the transmitter of FIG. 2, stage 68 corresponds to the receiver of FIG. 3, and stages 69 to 71 correspond to the inverse transforming member 20 of FIG. 1.

Today's satellite radio transmissions employ a 14-bit sampling value for transmission. Of these 14 bits, 11 bits are error protected and 3 bits remain unprotected. According to the present invention, it is proposed to utilize only the 11 protected bits for transmission by means of the described data reduction process. The already existing error protection then permits the reduced data to be less protected.

Thus, with a sampling frequency of 32 kHz, 11 bit/-sampling values can be transmitted in a monaural channel. If a coding method as disclosed in DE-OS No. 3,506,912 (published Aug. 28th, 1986) is employed, 4 bits per sample value and per monaural channel are sufficient. If a coded stereo signal is transmitted (2×4 bits) in an originally monaural channel (11 bits), 3 more bits remain which can be utilized for error protection, hereinafter called internal error code.

Figure 5:
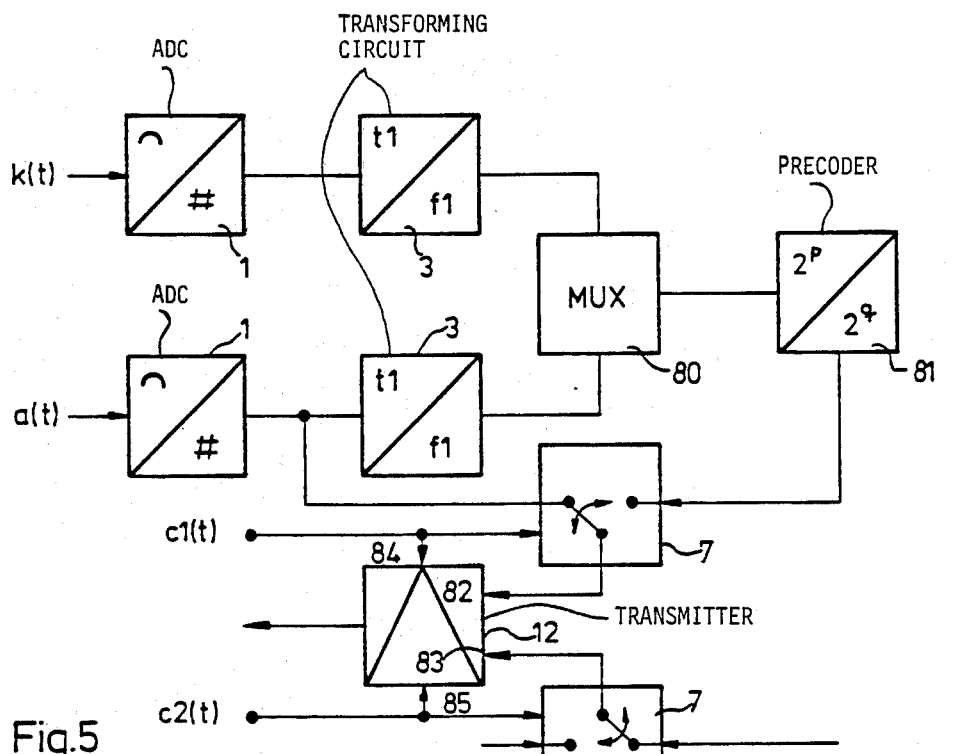
FIG. 5 is a partial block circuit diagram of a further embodiment of a transmitting station according to the invention for a single channel.

FIG. 5 is a partial block circuit diagram of a further embodiment of a transmitting station. In this embodiment, two audio signals a(t) and k(t) are processed in two signal paths each including a respective analog/-digital converter 1 and a transforming member 3. In a multiplexer 80, the two transformed signals from the transforming members 3 are multiplexed and sent via an output line to a precoder 81, which adds an internal error code to the multiplexed transformed signals. This code may be a BCH code. Such a code is described, for example, in F. J. Furrer, "Fehlerkorrigierende Blockcodierung für die Datenübertragung" [Error Correcting Block Coding For Data Transmission], published by Birkhäuser Verlag, 1981. From the precoder 81, a signal path leads to a switch 7 which sends either the precoded multiplexed signal from precoder 81, or the digitalized received audio signal a(t) from the associated ADC 1 to a transmitter 12'. The position of switch 7 is controlled by a control signal cl(t). Signal cl(t) is also fed to a transmitter 12' to indicate whether two multiplexed transformed signals or a digital signal is being fed to transmitter 12' from switch 7. In the transmitter 12', control signal cl (t) is added to the data stream as a special service (SD) bit and is recognized by a receiver. See in this connection Federal Republic of Germany published patent application No. 36 10 398 A1, published Oct. 1st, 1987.

Transmitter 12' may be configured as a channel unit 25 and transmit either a total of four transformed signals, two digital signals, or one digital signal and two transformed signals. For this purpose, a further a control signal c2(t) informs transmitter 12' whether the signal from a further switch 7 where output is connected to another input of transmitter 12' also includes two transformed digital signals or one nontransformed digital signal. An external error code is added in transmitter 12'. As indicated, transmitter 12' has four inputs, 82-84, i.e., one input 84 for the control signal cl(t), one input 85 for the control signal c2(t) and two inputs 82 and 83 for digitalized audio signals from the respective switches 7. Although only partially shown, it is understood that the circuit connected to inputs 83 and 85 is a duplicate of the circuit connected to inputs 82 and 84, so that a total of four digital/analog converters 1, four transforming members 3, two multiplexers 80, two precoders 81 and two switches 7 are provided.

Figure 6:
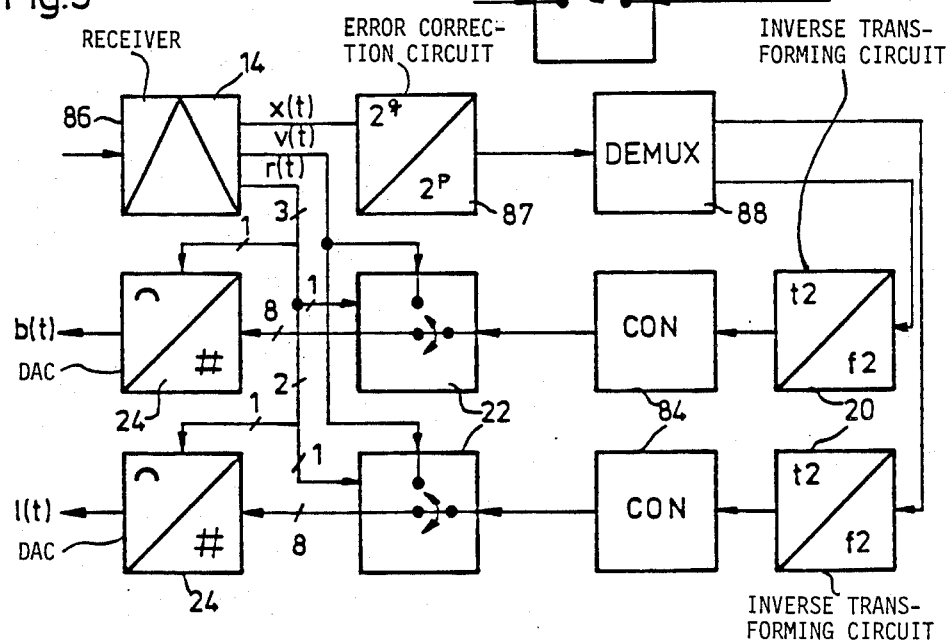
FIG. 6 is a block circuit diagram of a tuner or receiving station for use with the station of FIG. 5.

FIG. 6 is the block circuit diagram for a tuner or receiving station for the transmitting arrangement of FIG. 5. At input 86 of receiver 14' there then is present a signal which is demodulated, descrambled and demultiplexed in receiver 14'. Signals x(t), v(t) and r(t) are then present at the outputs of receiver 14'. Signal x(t) is a signal transformed in the transmitting station which is forwarded in the tuner to an error correction circuit 87. Error correction circuit 87 employs the internal code provided by precoder 81 to perform an error correction. After the error correction, the error corrected transformed signal reaches a demultiplexer 88. Demultiplexer 88 demultiplexes the error corrected signal and forwards two signals to two inverse transforming members 20 which transform the respective received spectral values into time domain signals.

From the two inverse transforming members 20, the inversely transformed signals reach respective concealment circuits 84 whose outputs are fed via respective lines to respective switches 22. The switches 22 are connected in synchronism and in one position both switches release the path between the respective concealment circuits 84 and respective DAC's 24. A monaural signal b(t) or a monaural signal 1(t) can be picked up at the outputs of the DAC's 24. Both DAC's 24 together furnish a stereo signal of signals b(t) or 1(t).

The signal path from error correction switch 87 to switches 22 processes two transformed signals which are inversely transformed in this path. Non-transformed signals are forwarded together with signal v(t) via a line to the other input of both switches 22. If the received signals are not transformed, the switches 22 are brought into their other position so that signal v(t) is sent from receiver 14' via the switches 22 to the respective DAC's 24. The separation of signal v(t) into the two output signals b(t) and 1(t) is effected by means of control signals r(t). Receiver 14' puts out three control signals r1(t), r2(t) and r3(t). Two of these control signals, r1(t) and r2(t), one for each one of the two DAC's 24, are used to clock the respective DAC's 24. The digital audio signal v(t) is multiplexed, i.e., both signals b(t) and 1(t) are present in signal v(t) in multiplexed form, and this multiplexed signal v(t) is separated in the two DAC's 24. Depending on when the DAC's 24 are clocked, only signal b(t) or only signal 1(t) reaches the outputs of the respective DAC's 24. Control signal r3(t) controls the switching of the two switches 22.

FIG. 7 is the block circuit diagram of a receiver 14' of FIG. 6 and shows the outputs for signals x(t), v(t) and r(t). As can be seen, this receiver has the same basic configuration as that of FIG. 3. However, in this embodiment, the transformed signal x(t) is picked up between the error correction circuit 55 and the concealment circuit 56 due to the presence of the corresponding subsequently connected concealment circuits 84 (see FIG. 6). Error correction circuit 55 utilizes the external code to perform an error correction. After utilization of the external code, the signal x(t) is picked up at the error correction circuit 55. Following concealment circuit 56, the multiplexed signal v(t) is put out. The demultiplexer and control unit 52 puts out the three control signals r(t) which serve to control switches 22 and DAC's 24. A demultiplexer and control unit which can be advantageously used is disclosed in European Patent Application No. 167 849 A2, published Jan. 15th 1986.

The present disclosure relates to the subject matter disclosed in Federal Republic of Germany patent application No. P 36 42 982.1, filed Dec. 17th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a system for transmitting and receiving digitalized audio signals including a transmitting station having respective analog to digital converter means for converting respective analog audio signals to respective digital audio signals, means for multiplexing the respective digital audio signals to arrange the resulting data sequences in timely succession within frames, and transmitting means for transmitting the multiplexed signal, and a receiving station having receiving means for demodulating and for demultiplexing a received transmitted signal, and means for converting the received signals into corresponding analog audio signals; the improvement comprising: respective transforming and coding means, disposed in said transmitting station and each connected between the output of a respective one of said analog to digital converter means and said multiplexing means, for transforming a respective said digital audio signal at the output of a respective one of said analog to digital converter means to a respective transformed digital signal representing the momentary frequency spectrum of the audio signal and for coding the transformed digital audio signal such that portions of the transformed signal are given different weights on the basis of psychoacoustic laws with respect to the accuracy of their representation.

2. A system as defined in claim 1, wherein said means for transmitting includes means for PSK modulating said multiplexed signal representing the momentary frequency spectrum of the digital audio signal.

3. A system as defined in claim 1, wherein both transformed signals representing the momentary spectrum of respective ones of said audio signals and nontransformed digitalized audio signals are fed to said means for multiplexing for transmission.

4. A system as defined in claim 1, further comprising respective controllable switch means for selectively feeding either the digital signal at the output of a respective one of said analog to digital converter means or the associated transformed digital signal to said multiplexing means.

5. A system as defined in claim 4, wherein: said controllable switch means is responsive to a control signal to selectively feed either the digital signal or the transformed digital signal to the multiplexing means; and said control signal is transmitted by said transmitter means and is detected by said converting means in said receiving station to determine whether or not a transformed digital signal is being received.

6. A system as defined in claim 5, wherein said control signal is fed to said multiplexing means and is multiplexed with the digitalized audio signals.

7. A system as defined in claim 5, wherein said converting means includes an inverse transforming and decoding means; a digital to analog converter; and further switch means, responsive to said control signal, for feeding either a received digital audio signal or an inversely transformed and decoded digital audio signal from said inverse transforming and decoding means to said digital to analog converter.

8. A system as defined in claim 1, wherein said transmitting station includes a plurality of channel units, each of which receives four of said analog audio signals, and with each including analog to digital converter means and transforming and coding means for processing four transformed digitalized audio signals.

9. A system as defined in claim 8, wherein each of said channel units includes: four of said analog to digital converter means and four of said transforming and coding means; first and second multiplexers, each multiplexing the outputs of a respective pair of said transforming and coding means; and first and second controllable switch means, each having first and second inputs and an output, for selectively passing a signal at the respective said first or said second input to the respective said output, and with each said first input being connected to the output of a respective one of said first and second multiplexers, each said second input being connected to the output of one of the two said analog to digital converters providing signals for the associated one of said first and second multiplexers, and each said output being connected to said multiplexing means.

10. A system as defined in claim 1, wherein the transmitted signal is a radio signal.

11. A system as defined in claim 10, wherein said radio signal is PSK modulated with said multiplexed signal in said means for transmitting.

12. A system as defined in claim 1, wherein said transmitting station further includes means for providing the transformed digital audio signal with an internal error code, and further means for providing said multiplexed signal to be transmitted with a further external error code.

* * * * *